United States Patent
Fitzpatrick et al.

(10) Patent No.: US 12,092,788 B2
(45) Date of Patent: *Sep. 17, 2024

(54) REPRESENTATION OF WIND FIELD BASED ON MODEL BLENDING AND DATA INTERPOLATION

(71) Applicant: Qrisq Analytics, LLC, Mobile, AL (US)

(72) Inventors: Patrick J. Fitzpatrick, Slidell, LA (US); Sean M. Huber, Slidell, LA (US); Benjamin P. Jelley, Pocomoke City, MD (US)

(73) Assignee: Qrisq Analytics, LLC, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,088

(22) Filed: Sep. 26, 2023

(65) Prior Publication Data

US 2024/0027647 A1  Jan. 25, 2024

Related U.S. Application Data

(63) Continuation of application No. 17/110,123, filed on Dec. 2, 2020, now Pat. No. 11,828,903.

(51) Int. Cl.
| | |
|---|---|
| *G01W 1/00* | (2006.01) |
| *G01P 5/00* | (2006.01) |
| *G06F 30/20* | (2020.01) |
| *G06F 111/10* | (2020.01) |

(52) U.S. Cl.
CPC ............... *G01W 1/00* (2013.01); *G01P 5/001* (2013.01); *G06F 30/20* (2020.01); *G06F 2111/10* (2020.01)

(58) Field of Classification Search
CPC ...... G01W 1/00; G06F 30/20; G06F 2111/10; G01P 5/001
See application file for complete search history.

(56) References Cited

U.S. PATENT DOCUMENTS

| | | |
|---|---|---|
| 2015/0332146 A1 | 11/2015 | Tan et al. |
| 2018/0075537 A1* | 3/2018 | Kaplan ................. G06Q 40/08 |

(Continued)

OTHER PUBLICATIONS

Du N, Xue M, Zhao K, Min J. Impact of assimilating airborne Doppler radar velocity data using the ARPS 3DVAR on the analysis and prediction of Hurricane Ike (2008). Journal of Geophysical Research: Atmospheres. Sep. 27, 2012;117(D18). (Year: 2012).*

(Continued)

*Primary Examiner* — Chuen-Meei Gan
(74) *Attorney, Agent, or Firm* — Seed IP Law Group LLP

(57) ABSTRACT

An example method for processing wind field data includes generating wind field base data using the preliminary data and one or more empirical equations based on climatology. The wind field base data includes multiple data sets each associated with a different time-point in a first set of time-points. The method also includes performing spatial interpolation and temporal interpolation over the wind field base data to generate a sequence of two-dimensional wind field representations each associated with a different time-point in a second set of time-points, and visualizing the sequence of two-dimensional wind field representations.

20 Claims, 7 Drawing Sheets

(56) References Cited

U.S. PATENT DOCUMENTS

2018/0143347 A1    5/2018    Sampson et al.
2020/0170200 A1    6/2020    Huber et al.

OTHER PUBLICATIONS

Hazelton AT, Zhang X, Gopalakrishnan S, Ramstrom W, Marks F, Zhang JA. High-resolution ensemble HFV3 forecasts of Hurricane Michael (2018): Rapid intensification in shear. Monthly Weather Review. May 1, 2020;148(5):2009-32. (Year: 2020).*

Mohr CG, Miller LJ, Vaughan RL, Frank HW. The merger of mesoscale datasets into a common Cartesian format for efficient and systematic analyses. Journal of Atmospheric and Oceanic Technology. Mar. 1, 1986;3(1):143-61. (Year: 1986).*

Xiao Q, Zhang X, Davis C, Tuttle J, Holland G, Fitzpatrick PJ. Experiments of hurricane initialization with airborne Doppler radar data for the Advanced Research Hurricane WRF (AHW) model. Monthly Weather Review. Sep. 1, 2009;137(9):2758-77. (Year: 2009 ).*

Chad et al. "Tropical cyclone trend analysis using enhanced parallel coordinated and statistical analytics," Cartography and Geographic Information Science 36(3): 251-265, Jul. 23, 2009.

Du et al., "Impact of assimilating airborne Doppler radar velocity data using the ARPS 3DVAR on the analysis and prediction of Hurricane Ike (2008)," Journal of Geophysical Research 117(D18113), Sep. 25, 2012. (20 pages).

Hazelton et al., "High-resolution ensemble HFV3 forecasts of Hurricane Michael (2018): Rapid Intensification in shear," Monthly Weather Review 148(5): 2009-2032, May 1, 2020.

Mohr et al., "The merger of mesoscale datasets into a common cartesian format for efficient and systemic analyses," Journal of Atmospheric and Oceanic Technology 3(1): 143-161, Mar. 1986.

Soto et al., "Advection of Karenia brevis blooms from the Florida Panhandle towards Mississippi coastal waters," Harmful Algae 72:46-64, Feb. 2018.

Xiao et al., "Experiments of hurricane initialization with airborne Doppler radar data for the Advanced Research Hurricane WRF (AHW) Model," Monthly Weather Review 137(9):2758-2777, Sep. 2009.

* cited by examiner

REPRESENTATION OF WIND FIELD BASED ON MODEL BLENDING AND DATA INTERPOLATION

BACKGROUND

Technical Field

The present disclosure relates to wind field representation, and in particular to high-resolution, time-varying representation of tropical cyclone wind fields.

Description of the Related Art

A tropical cyclone is a rapidly rotating storm system characterized by a low-pressure center, a closed low-level atmospheric circulation, strong winds, and a spiral arrangement of thunderstorms that produce heavy rain or squalls. The winds move in a circle, whirling round their central clear eye. A hurricane is a tropical cyclone that occurs in the Atlantic Ocean and northeastern Pacific Ocean. Tropical cyclones are typically between 100 and 2,000 km (62 and 1,243 mi) in diameter.

Coastal regions are particularly vulnerable to the impact of a tropical cyclone. Coastal damage may be caused by strong winds and rain, high waves (due to winds), storm surges (due to wind and severe pressure changes), and the potential of spawning tornadoes. Tropical cyclones may cause multi-hour or multi-day extremely heavy rain from the coastline, and in turn can lead to river flooding, overland flooding, and a general overwhelming of local water control structures across a large area.

When a tropical system forms, the National Hurricane Center (NHC) analyzes satellite and surface wind data to create forecasts with wind field depiction. The NHC then uses this information to define the location of up to 13 data points throughout the entire storm. This provides a very general view of the storm extent, but has limitations as a basis for cyclone analysis and damage control.

DETAILED DESCRIPTION

Figure 1:
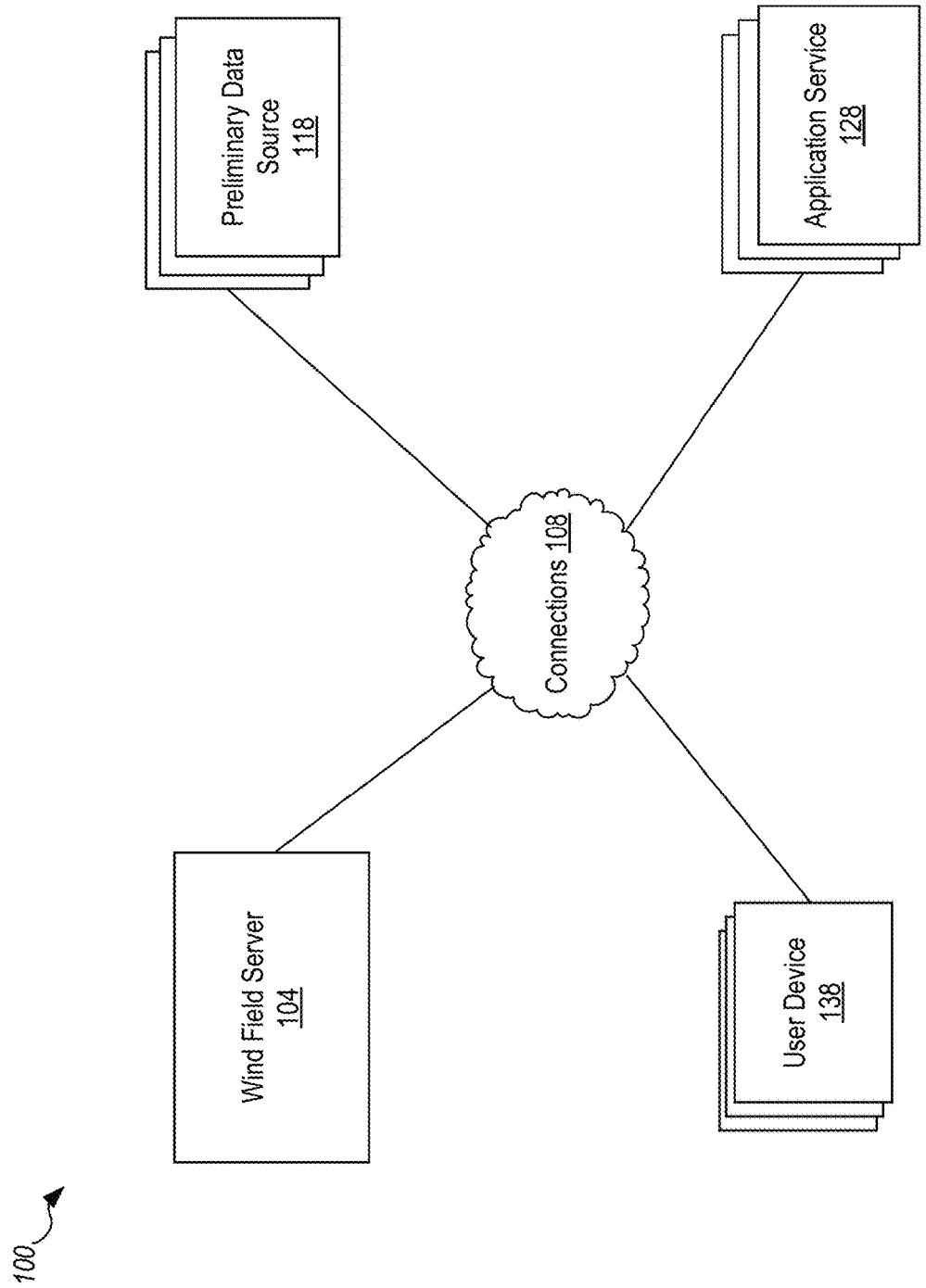
FIG. 1 is an overview block diagram illustrating an exemplary networked environment for wind field data processing in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is comprised. For instance, a subset of a set of ten items will have less than ten items and at least one item.

The presently disclosed technology is directed to the generation of high-resolution and time-varying representation of winds and pressure for a forecast or a hindcast. In some embodiments, the spatial and temporal granularity of wind field representation can be dynamic and adjustable to capture the high-resolution of tropical cyclone eyewall and wind field details. The presently disclosed technology can be used to efficiently generate and update a comprehensive wind field representation that enables near real-time damage prediction and assessment. For example, storm surge model predictions are considerably sensitive to the wind forcing that drives the surge. In accordance with some embodiments, the presently disclosed technology can be used to generate a comprehensive two-dimensional representation of the tropical system's wind structure (e.g., including hundreds of thousands of data points) by blending results from several hurricane wind models, for producing short-term, medium-term, and/or long-term forecast with narrow time intervals (e.g., a 5-day forecast period with 15-minute time steps).

In certain embodiments of the presently disclosed technology, a wind field server receives preliminary data regarding a tropical weather system from multiple sources. The preliminary data can include wind field descriptors in accordance with four quadrants of a coordinate system. The wind field descriptors can include radii of winds of different specified speeds. The preliminary data can include forecast or observed data associated with different time-points.

The wind field server generates wind field base data using the preliminary data and empirical equations based on climatology (e.g., Holland Equation, Schloemer Equation, Atkinson and Holliday Equation, Dvorak Technique, combination of the same or the like). This can be achieved by blending the preliminary data obtained from multiple sources, computing additional radii of winds in accordance with the empirical equations based on climatology, and/or adjusting certain data in accordance with physical consistency of a tropical cyclone wind field. The wind field base data can include radii of maximum winds corresponding to a tropical cyclone eyewall. The wind field base data can include multiple data sets each associated with a different time-point.

The wind field server performs spatial interpolation and temporal interpolation over the wind field base data to generate a sequence of two-dimensional wind field representations each associated with a different time-point, with a much finer granularity. The spatial interpolation can be performed differently for data representing winds inside the tropical cyclone eyewall than for data representing winds outside the tropical cyclone eyewall. The temporal interpolation can be performed after the spatial interpolation is performed on individual data sets associated with distinct time-points.

In various embodiments, the presently disclosed technology may provide various functionality to enable presentation of one or more aspects of the wind field representation and related information (e.g., storm surge, pressure, rainfall, damage assessment, or the like). As non-limiting examples, in various embodiments such functionality may include one or more of the following: providing a user interface—such as a command-line query interface, a GUI, or application program interface (API)—to allow user devices, other applications, and/or other computing services to interact with the wind field server.

FIG. 1 is an overview block diagram illustrating an exemplary networked environment 100 for wind field data processing in accordance with some embodiments of the techniques described herein. The exemplary networked environment 100 includes a wind field server 104, one or more preliminary data sources 118, one or more application services 128, and one or more user devices 138, which are interconnected with one another via at least some part of connections 108. For purposes of clarity, the exemplary networked environment 100 includes a single wind field server 104; it will be appreciated that in various scenarios and embodiments, multiple such entities or functional equivalents may be communicatively connected with other entities of environment 100.

In the depicted exemplary networked environment 100, the connections 108 may comprise one or more computer networks, one or more wired or wireless networks, satellite transmission media, one or more cellular networks, or some combination thereof. The connections 108 may include a publicly accessible network of linked networks, possibly operated by various distinct parties, such as the Internet. The connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the connections 108 may include various types of wired and/or wireless networks in various situations, including satellite transmission. In addition, the connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a user device 138 include, but are not limited to, one or a combination of the following: a "computer," "mobile device," "tablet computer," "smart phone," "handheld computer," and/or "workstation," etc. The user device(s) 138 may be any suitable computing device or electronic equipment that is, e.g., operable to communicate with the wind field server 104 and to interact with user(s) for processing wind field data and presenting wind field representation(s).

In various embodiments, the wind field server 104 can be implemented in software and/or hardware form on one or more computing devices including a "computer," "mobile device," "tablet computer," "smart phone," "handheld computer," "server," "computer cluster," and/or "workstation," etc. The interactions of the wind field server 104 with other entities of the environment 100 may occur in various ways, such as in an interactive manner via a GUI (e.g., in the form of Web pages) that is provided by the wind field server 104 to users through associated user devices 138. Data and information may also be provided in a programmatic manner by one or more software applications via API(s) between the preliminary data source(s) 118 and the wind field server 104, and between the wind field server 104 and the application service(s) 128.

In various embodiments, individual preliminary data sources 118 and application services 128 can be implemented in software and/or hardware form on one or more computing devices including a "computer," "mobile device," "tablet computer," "smart phone," "handheld computer," and/or "workstation," etc. The preliminary data source(s) 118 can provide access to preliminary wind field data for target tropical system(s), and the application service(s) 128 can access or otherwise utilize the wind field representation(s) generated by the wind field server 104 for weather analysis, damage assessment, resource deployment planning, and/or other applications.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
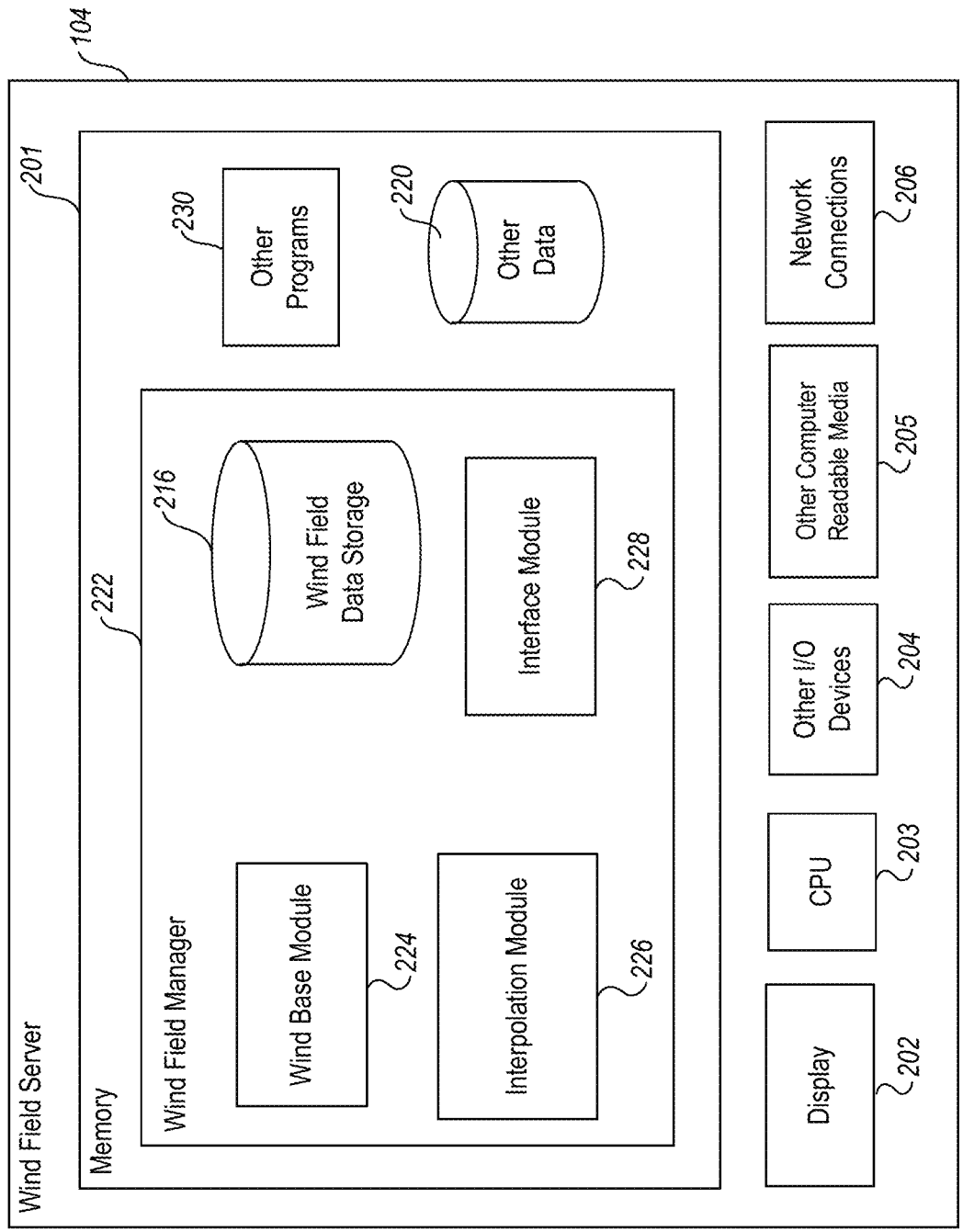
FIG. 2 is a block diagram illustrating elements of an exemplary wind field server utilized in accordance with some embodiments of the techniques described herein.

FIG. 2 is a block diagram illustrating elements of an exemplary wind field server 104 utilized in accordance with some embodiments of the techniques described herein.

In some embodiments, one or more general purpose or special purpose computing systems or devices may be used to implement the wind field server 104. In addition, in some embodiments, the wind field server 104 may comprise one or more distinct computing systems or devices, and may span distributed locations. Furthermore, each block shown in FIG. 2 may represent one or more such blocks as appropriate to a specific embodiment or may be combined with other blocks. Also, the wind field manager 222 may be implemented in software, hardware, firmware, or in some combination to achieve the capabilities described herein.

In the embodiment shown, the wind field server 104 comprises a computer memory ("memory") 201, a display 202 (including, but not limited to a light emitting diode (LED) panel, cathode ray tube (CRT) display, liquid crystal display (LCD), touch screen display, projector, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206. The wind field manager 222 is shown residing in memory 201. In other embodiments, some portion of the contents and some, or all, of the components of the wind field manager 222 may be stored on and/or transmitted over the other computer-readable media 205. The components of the wind field server 104 and wind field manager 222 can execute on one or more CPUs 203 and implement the preliminary data processing, base data generation, spatial and temporal interpolation, wind field data conversion, visualization of wind field representation, and/or other functions described herein. In some embodiments, the wind field manager 222 may operate as, be part of, or work in conjunction and/or cooperation with other software applications stored in memory 201 or on various other computing devices. In some embodiments, the wind field manager 222 also facilitates communication with peripheral devices via the I/O devices 204, or with another device or system via the network connections 206.

The wind base module 224 is configured to perform actions related to wind field base data processing. In some embodiments, the wind base module 224 is configured to perform preliminary data processing, wind model blending, data consistency evaluation and adjustment, base data generation, combinations of the same or the like. In some embodiments, the wind base module 224 stores, retrieves, or otherwise accesses at least some preliminary or base data on some portion of the wind field data storage 216 or other data storage internal or external to the wind field server 104.

The interpolation module 226 is configured to perform actions related to spatial and temporal interpolation. In some embodiments, the interpolation module 226 is configured to perform interpolation parameter or model determination, spatial interpolation calculation, temporal interpolation calculation, data integrity check, interpolation updating, combination of the same or the like. In some embodiments, the interpolation module 226 stores, retrieves, or otherwise accesses at least some interpolation-related data on some portion of the wind field data storage 216 or other data storage internal or external to the visual testing server 104.

The interface module 228 is configured to perform actions related to facilitating interactions with user device(s) 138 or other systems or devices. In some embodiments, the interface module 228 is configured to perform GUI generation, GUI processing, user input processing, presentation of wind field representation and updates, combination of the same or the like. In some embodiments, the interface module 228 stores, retrieves, or otherwise accesses at least some user interface-related data on some portion of the wind field data storage 216 or other data storage internal or external to the visual testing server 104.

Other code or programs 230 (e.g., further data processing modules, a program guide manager module, a Web server, and the like), and potentially other data repositories, such as data repository 220 for storing other data (tropical system profiles, preferences and configuration data, etc.), may also reside in the memory 201, and can execute on one or more CPUs 203. Of note, one or more of the components in FIG. 2 may or may not be present in any specific implementation. For example, some embodiments may not provide other computer readable media 205 or a display 202.

In some embodiments, the wind field server 104 and manager 222 include API(s) that provides programmatic access to add, remove, or change one or more functions of the wind field server 104. In some embodiments, components/modules of the wind field server 104 and manager 222 are implemented using standard programming techniques. For example, the wind field manager 222 may be implemented as an executable running on the CPU 203, along with one or more static or dynamic libraries. In other embodiments, the wind field server 118 and manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the wind field server 104 to perform the functions of the wind field manager 222. In some embodiments, instructions cause the CPU 203 or some other processor, such as an I/O controller/processor, to perform at least some functions described herein including, but are not limited to, preliminary data processing, base data generation, wind field data interpolation, or the like.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a wind field manager 222 implementation. Also, other functions could be implemented and/or performed by each component/module, and in different orders, and by different components/modules, yet still achieve the functions of the wind field server 104 and manager 222.

In addition, programming interfaces to the data stored as part of the wind field server 104 and manager 222, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The wind field storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the wind field manager 222.

Furthermore, in some embodiments, some or all of the components of the wind field server 104 and manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
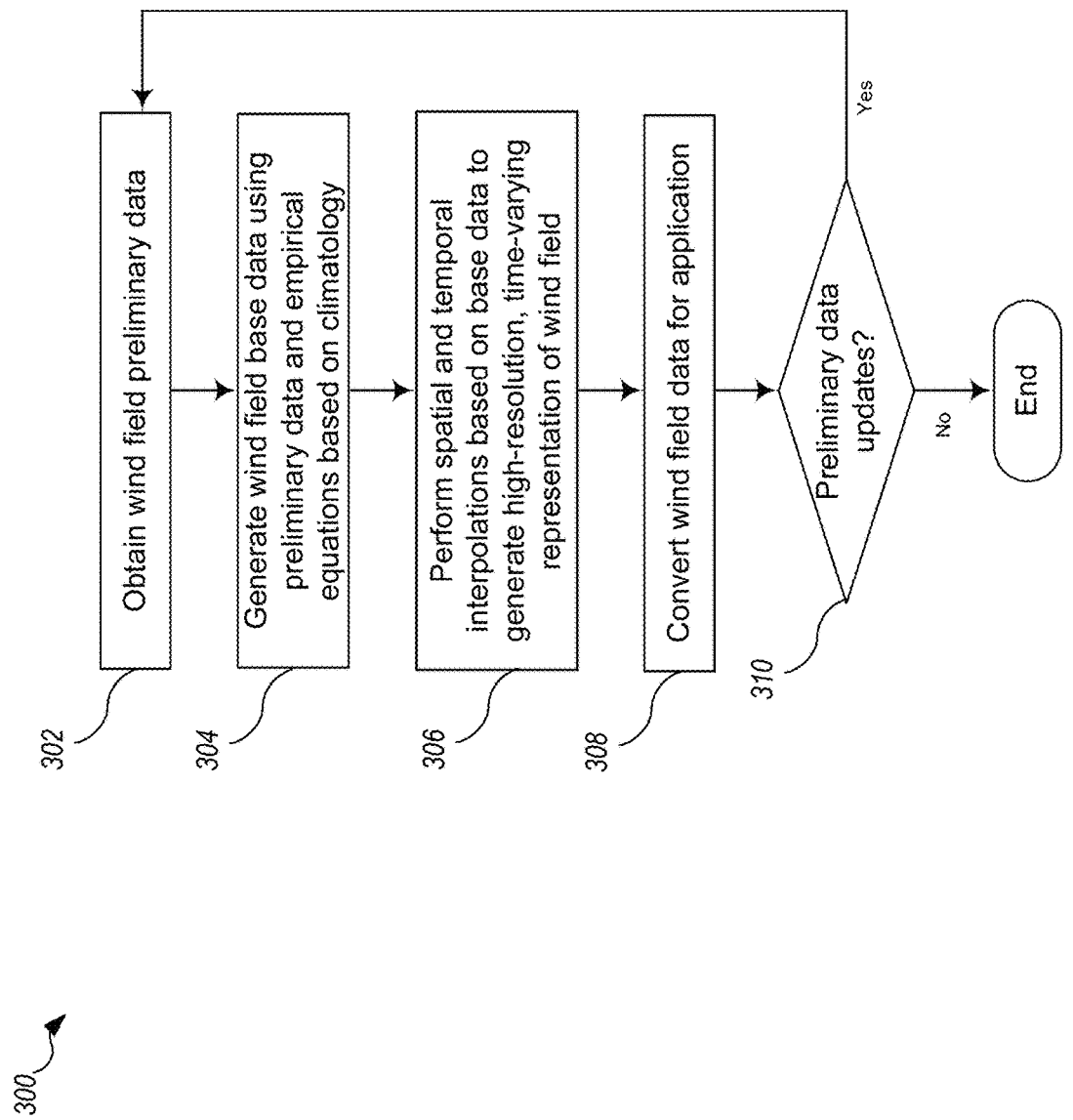
FIG. 3 is a flow diagram depicting an exemplary wind field representation routine performed in accordance with some embodiments of the techniques described herein.

FIG. 3 is a flow diagram depicting an exemplary wind field representation routine 300 performed in accordance with some embodiments of the techniques described herein. Illustratively, the routine 300 is performed by the wind field server 104. In some embodiments, part of the routine 300 is performed by the preliminary data source(s) 118, application service(s) 128, and/or user device(s) 138.

The routine 300 begins at block 302, which includes obtaining wind field preliminary data regarding a target tropical system from one or more preliminary data sources. In some embodiments, the preliminary data includes wind field descriptors in accordance with four quadrants of a coordinate system. The wind field descriptors can include radii (distances from the center origin of the coordinate system) of winds of different specified speeds. The preliminary data can include forecast or observed data associated with different time-points.

Figure 4:
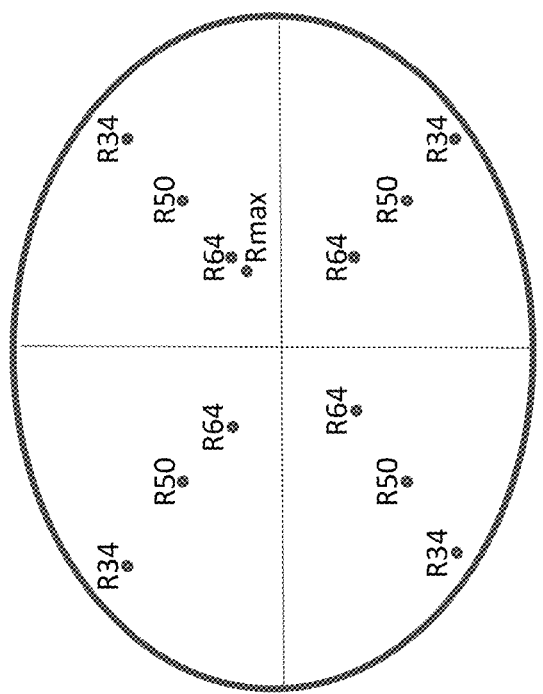
FIG. 4 shows an example of wind field preliminary data provided by National Hurricane Center (NHC).

As an example, the preliminary data includes National Hurricane Center (NHC) Forecast file with Automated Tropical Cyclone Forecasting System (ATCF) forecasts, including NRC's Official Forecast (OFCL). The NHC forecasts are typically issued every 6 hours. FIG. 4 shows an example of wind field data provided by NHC forecasts. As illustrated, an NHC wind field representation is divided into four quadrants and includes 13 data points: Rmax—eyewall maximum wind radius; and individual sets of the radii R64, R50, and R34—the distances between where 64 knot, 50 knot, and 34 knot winds are located and the storm center, in each of the four quadrants. NHC typically provides 5-day forecast at 12-hour time step until hour 72, then 24-hour time step for hours 96 and 120. The wind field server 104 can predict a central pressure of the tropical system using applicable empirical equation(s) based on NRC's maximum wind forecast. A surface pressure bias adjustment can be performed (e.g., to limit pressure from being larger than 1012 mb).

The preliminary data can further include additional numerical data (e.g., forecasts or models provided by NHC or other entities) of the target tropical system. The additional numerical data can include, but not limited to, one or more of:
  HWRF—NHC Hurricane Weather Research and Forecast Model,
  HWFI—NHC Hurricane Weather Research and Forecast Model Interpolated from 6-hours ago,
  CTCI—Naval Research Laboratory (NRL) COAMPS-TC model interpolated from 6-hours ago,
  HMNI—Hurricane Multi-scale Ocean-coupled Non-hydrostatic Model interpolated from 6-hours ago,
  RVCN—Wind Radii Consensus Multi-model Radii,
  AVNI—Global Forecast System (GFS) National Weather Service model interpolated from 6-hours ago,
  HMON—Hurricane Multi-scale Ocean-coupled Non-hydrostatic Model, and
  AVNO—Global Forecast System (GFS) National Weather Service Model.

Referring back to FIG. 3, at block 304, the routine 300 includes generating wind field base data using the preliminary data and empirical equations based on climatology. It should be noted that in some embodiments, the preliminary data already includes sufficient data points and can be used as base data.

In some embodiments, generating the base data is achieved by blending the preliminary data obtained from multiple sources, computing additional radii of winds in accordance with the one or more empirical equations based on climatology, and/or adjusting certain data in accordance with physical consistency of a tropical cyclone wind field. The wind field base data can include radius of maximum winds (e.g., in the northeast quadrant) corresponding to a tropical cyclone eyewall. The wind field base data can include multiple data sets each associated with a different time-point.

As an example, the wind field server 104 can extract all initial conditions and radii available from the OFCL as the starting point guidance, for storm location (center of TC eye), max wind speed, initial minimum pressure, and 4-quadrant distance forecasts for radius of 64-knot winds, radius of 50-knot winds, and radius of 34-knot winds. The wind field server 104 can perform various checks on the extracted data to determine whether inconsistencies or physical impossibilities exist in NHC forecast (e.g., the northeast R64 distance being larger than the northeast R50 distance), and make adjustments accordingly.

The wind field server 104 can determine the radius of maximum winds (Rmax) using HWRF model and/or other applicable models, and quality check that Rmax does not exceed a threshold value (e.g., 40 nautical miles) in accordance with physical properties of hurricanes. Applicable empirical equations based on climatology can be applied to calculate new radii values for additional forecast hours (e.g., 96 and 120 hour). Since NHC does not provide an R64 at hour 72, R64 can also be computed from R50 at forecast hour 72 using applicable empirical equation(s).

Alternatively or in addition, radii can be obtained from the other model forecasts. For example, the wind field server 104 can select one or more model forecasts that are most consistent with the NHC forecast, based on similarity measures of track and intensity. The wind field server 104 can determine if the selected model forecast(s) includes radii measurements that are not available from the NHC OFCL forecast, and add to the base data.

In this way, the wind field server 104 can produce, as part of the wind field base data, the original, adjusted, supplemented, and/or otherwise obtained radii measurements for each quadrant at each time step as originally provided in OFCL. Another round of quality control checks can be performed on the data in accordance with tropical cyclone physical properties. Additionally, the translation speed of the target tropical system can be computed, and applicable algorithms can be applied to northwest and southwest quadrants to decrease their Vmax from the northeast quadrant's Vmax based on the translation speed.

Because the wind field physics are quite different between the inside and the outside of the TC eyewall, the wind field server 104 can use different empirical equations based on applicable climatology models to generate additional base data. For example, for each quadrant at each time step, additional radii of specific wind speeds that increase from the center of TC eye to the eyewall (Rmax) can be computed using applicable empirical equation(s) and Vmax, and additional radii of specific wind speeds that decrease from the eyewall out to storm periphery (e.g., 1000 kilometers from TC center) can be computed using applicable empirical equation(s) and existing radii of winds outside Rmax. The quantity of the additional data points can be determined based on response time requirements, complexity of empirical equation(s), computational resources, combination of the same or the like. In some embodiments, the wind field server 104 further computes respective pressure values for the individual radii in the base data using their corresponding wind speed values and applicable empirical equation(s).

At block 306, the routine 300 includes performing spatial interpolation and temporal interpolation over the wind field base data to generate high-resolution, time-varying representation of wind field for the target tropical system. The wind field server 104 can generate a sequence of two-dimensional wind field representations each associated with a different time-point, with a much finer granularity. In some embodiments, the spatial interpolation can be performed differently for data representing wind and/or pressure inside the TC eyewall than for those outside the TC eyewall. The temporal interpolation can be performed after the spatial interpolation is performed on individual data sets associated with distinct time-points.

As an example, the spatial interpolation can include generating radial wind speed values at a user-specified or dynamically-generated resolution (e.g., every 10 kilometers, 1 kilometer, 0.1 kilometer, or the like) in each quadrant based on a curve fit to the base data points. More specifically, applicable equations can be used to interpolate radii and speed of winds between the TC center and the radius of maximum winds (corresponding to TC eyewall) depending on peak wind intensity; speed for winds outside the eyewall can be interpolated using applicable shape-preserving spline fitting. Based on the wind speed data, corresponding pressure can be computed for individual radii for each quadrant using applicable empirical equation(s) or a standard cyclostrophic-based equation. This can be done for each quadrant at each time step as originally provided in OFCL, and the output is a radial interpolated data set with user-specified or dynamically-generated resolution, which can be orders of magnitude higher than the base data or preliminary data.

The spatial interpolation output can then be temporally interpolated in accordance with a user-specified or dynamically-generated resolution (e.g., every 15 minutes, 5 minutes, 1 minute, or the like). More specifically, the quadrant radial information (e.g., wind and pressure values) are time-interpolated for each distinct radius using a shape-preserving spline. Similar to the spatial interpolation, the temporal interpolation thereby outputs wind field data with much higher temporal resolution (e.g., from 12-hour or 24-hour time step to 1-minute time step). In some embodiments, if the eyewall size changes rapidly in a period of time (e.g., 6 hours), the temporal interpolation can result in two eyewalls. In these cases, the wind field server 104 can shift the eyewall size and avoid the incorrect generation of two eyewalls and a peak negative wind bias.

Figure 5:
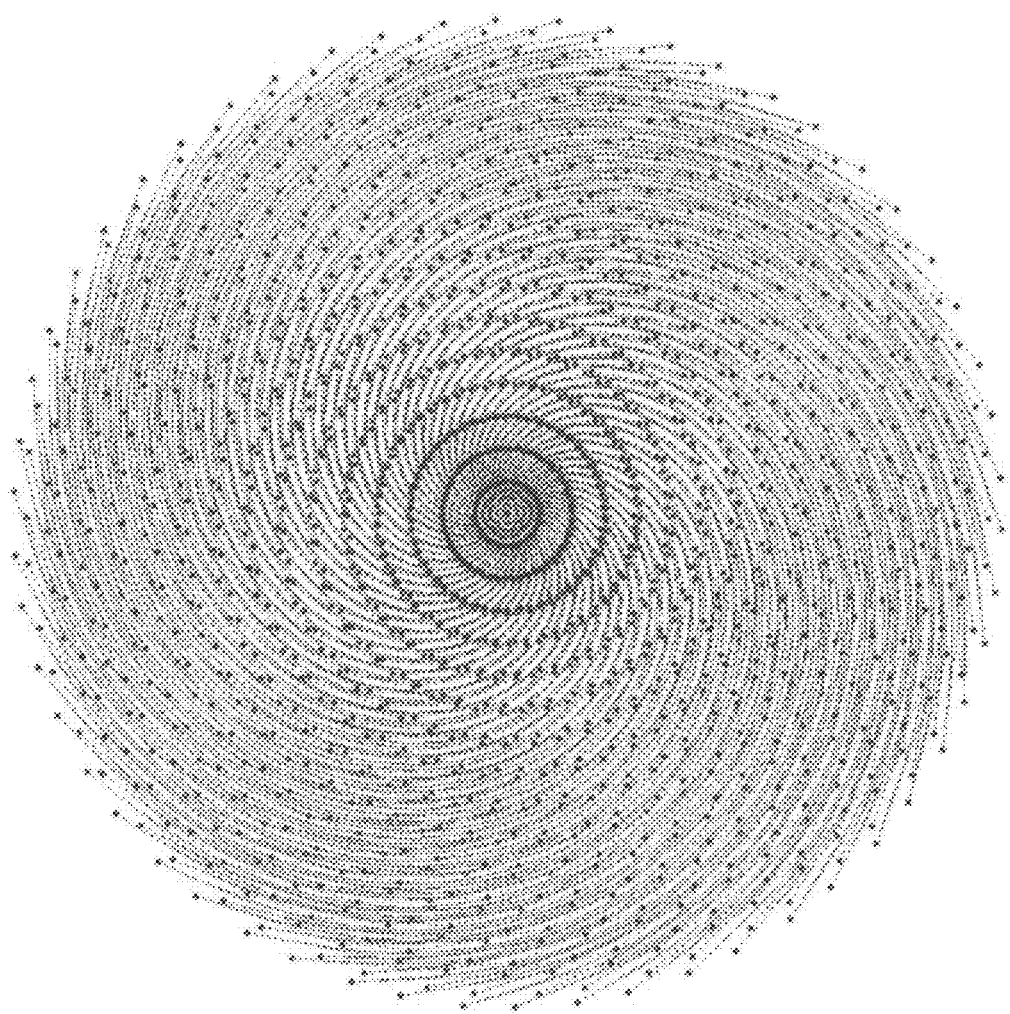
FIG. 5 illustrates an example wind field representation in accordance with some embodiments of the techniques described herein.

With continued reference to FIG. 3, at block 308, the routine 300 includes converting the wind field data into appropriate format for other application(s) (e.g., for storm surge modeling). The wind field server 104 can project or otherwise convert the radii-based wind and pressure values to fit onto two-dimensional, high-resolution square grid points with flexibility in grid spacing and time interval. FIG. 5 illustrates an example of a part of such representation, in accordance with some embodiments of the techniques described herein.

For example, at each time step, the wind field data can be interpolated radially and azimuthally to fit onto the two-dimensional grid. The interpolation can be linear and/or based on a spline. Illustratively, the azimuthal interpolation can be specially designed from a Catmull-Spline for 4-points. The inflow angle can be computed based on applicable empirical equation(s).

Figure 6A:
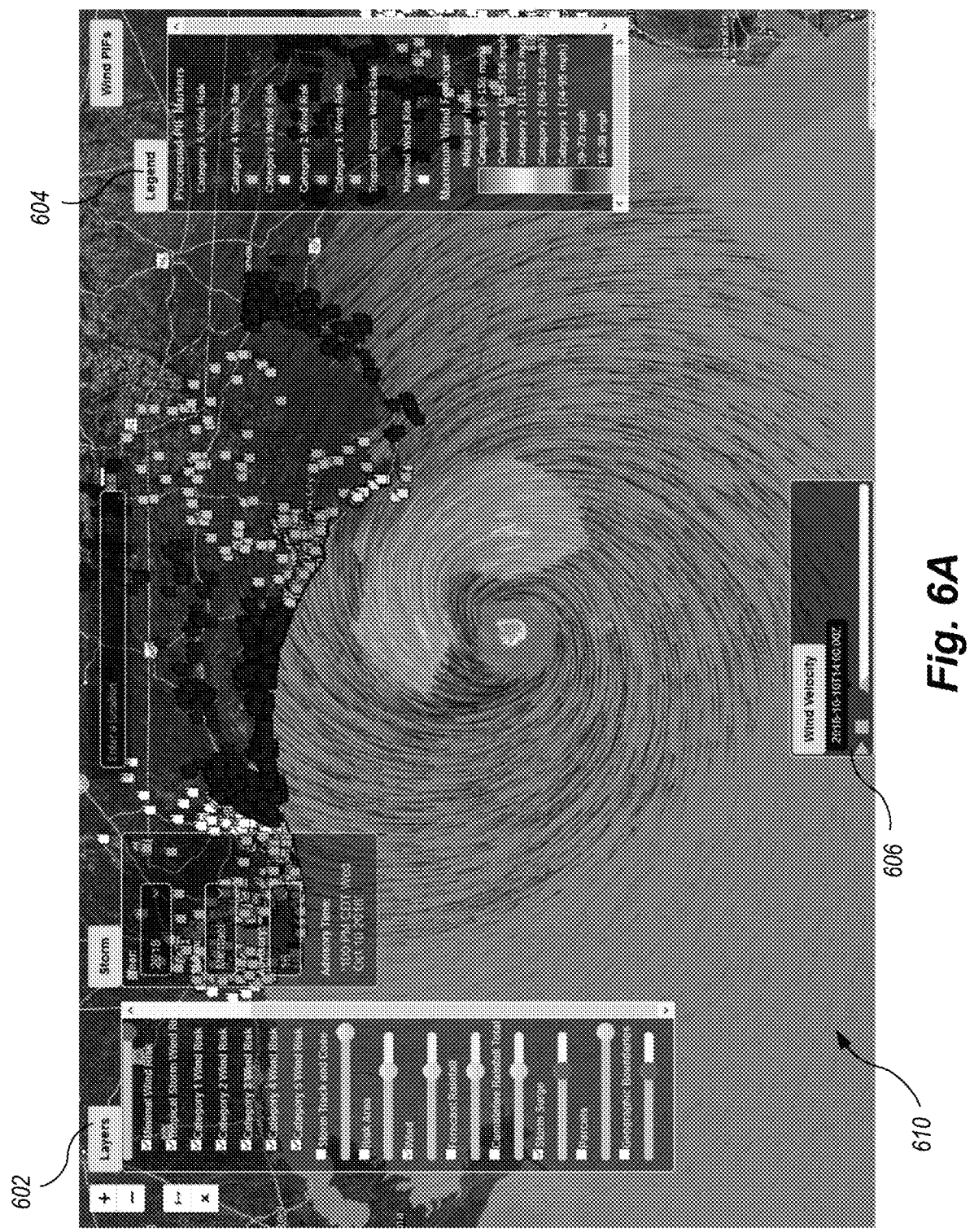
FIGS. 6A and 6B show example GUIs presenting tropical cyclone wind field and related information in accordance with some embodiments of the techniques described herein.
Figure 6B:
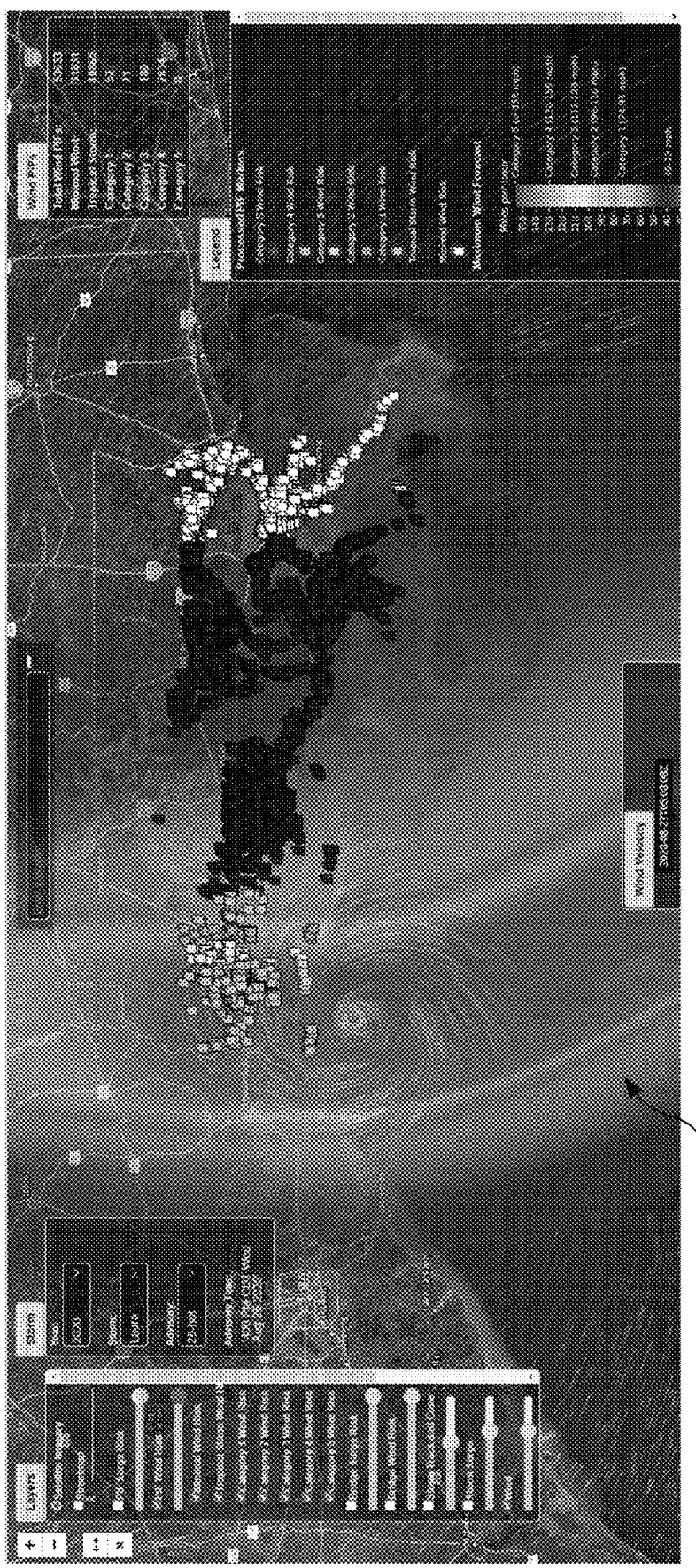

FIGS. 6A and 6B show example GUIs presenting tropical cyclone wind field and related information (e.g., hurricane risk, storm surge, pressure, rainfall, damage assessment, or the like) in accordance with some embodiments of the techniques described herein. The GUIs can be generated by the wind field server 104, and in some cases, incorporating data exchanged with one or more application services 128. The GUIs can be presented via one or more user devices 138 and/or display(s) associated with the wind field server 104. As shown in FIG. 6A, the GUI can include controls 602 for selecting the type(s) of analysis to be performed, colored indicators 604 for visualizing results of the analysis, and detailed two-dimensional visualization 610 of the wind field. In some embodiments, the GUI further includes a control 606 for presenting an animation of the wind field representation and related information, in accordance with its time-steps. As shown in FIG. 6B, the GUI can include a two-dimensional cyclone trajectory 620 where different shades of color indicate corresponding maximum wind forecasts.

Referring back to FIG. 3, at block 310, the routing 300 includes determining whether the preliminary data is updated. If so, the routine 300 proceeds back to block 302; otherwise, the routine 300 ends.

Those skilled in the art will appreciate that the various operations depicted via FIG. 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for generating a high-resolution, time-varying representation of wind field to provide near real-time prediction and assessment, the method comprising:
   obtaining wind field base data including a plurality of data sets regarding a tropical weather system in accordance with four quadrants of a coordinate system, each data set of the plurality of data sets associated with a different time-point in a first set of time-points;
   performing spatial interpolation and temporal interpolation based on radii associated with the wind field base data with respect to the coordinate system, to generate a temporal sequence of two-dimensional wind field representations each associated with a different time-point in a second set of time-points, wherein the two-dimensional wind field representations have a higher spatial resolution than the wind field base data and the second set of time-points has a higher temporal resolution than the first set of time-points; and
   presenting animation of the sequence of two-dimensional wind field representations with data related to at least one of storm surge, pressure, rainfall, or damage assessment, via one or more displays.

2. The method of claim 1, further comprising converting the sequence of two-dimensional wind field representations to fit onto a two-dimensional grid.

3. The method of claim 2, wherein the converting is based on radial and azimuthal interpolation.

4. The method of claim 1, wherein the spatial interpolation is performed based on a curve fit over at least a portion of the wind field base data.

5. The method of claim 4, wherein the spatial interpolation between a center of a tropical cyclone and an eyewall of the tropical cyclone is based on peak wind intensity.

6. The method of claim 4, wherein the spatial interpolation outside the eyewall of the tropical cyclone is based on shape-preserving spline fitting.

7. The method of claim 1, further comprising determining a translation speed of the tropical weather system.

8. The method of claim 7, further comprising adjusting at least a portion of the wind field base data based on the translation speed.

9. One or more non-transitory computer-readable media collectively having contents configured to cause one or more processors to perform actions for generating a high-resolution, time-varying representation of wind field to provide near real-time prediction and assessment, the actions comprising:
   obtaining wind field base data including a plurality of data sets regarding a tropical weather system in accordance with four quadrants of a coordinate system, each data set of the plurality of data sets associated with a different time-point in a first set of time-points;
   performing spatial interpolation and temporal interpolation based on radii associated with the wind field base data with respect to the coordinate system, to generate a temporal sequence of two-dimensional wind field representations each associated with a different time-point in a second set of time-points, wherein the two-dimensional wind field representations have a higher spatial resolution than the wind field base data and the second set of time-points has a higher temporal resolution than the first set of time-points; and
   presenting animation of the sequence of two-dimensional wind field representations with data related to at least one of storm surge, pressure, rainfall, or damage assessment, via one or more displays.

10. The one or more computer-readable media of claim 9, wherein the actions further comprise converting the sequence of two-dimensional wind field representations to fit onto a two-dimensional grid.

11. The one or more computer-readable media of claim 10, wherein the converting is based on radial and azimuthal interpolation.

12. The one or more computer-readable media of claim 9, wherein the spatial interpolation is performed based on a curve fit over at least a portion of the wind field base data.

13. The one or more computer-readable media of claim 12, wherein the spatial interpolation between a center of a tropical cyclone and an eyewall of the tropical cyclone is based on peak wind intensity.

14. The one or more computer-readable media of claim 12, wherein the spatial interpolation outside the eyewall of the tropical cyclone is based on shape-preserving spline fitting.

15. The one or more computer-readable media of claim 9, wherein the actions further comprise adjusting at least a portion of the wind field base data based on a translation speed of the tropical weather system.

16. A system, comprising:
   one or more processors; and
   memory storing contents that, when executed by the one or more processors, cause the system to perform actions for generating a high-resolution, time-varying representation of wind field to provide near real-time prediction and assessment, the actions comprising:

obtaining wind field base data including a plurality of data sets regarding a tropical weather system in accordance with four quadrants of a coordinate system, each data set of the plurality of data sets associated with a different time-point in a first set of time-points;

performing spatial interpolation and temporal interpolation based on radii associated with the wind field base data with respect to the coordinate system, to generate a temporal sequence of two-dimensional wind field representations each associated with a different time-point in a second set of time-points, wherein the two-dimensional wind field representations have a higher spatial resolution than the wind field base data and the second set of time-points has a higher temporal resolution than the first set of time-points; and presenting animation of the sequence of two-dimensional wind field representations with data related to at least one of storm surge, pressure, rainfall, or damage assessment, via one or more displays.

17. The system of claim 16, wherein the actions further comprise converting the sequence of two-dimensional wind field representations to fit onto a two-dimensional grid.

18. The system of claim 16, wherein the spatial interpolation performed between a center of a tropical cyclone and an eyewall of the tropical cyclone is based on peak wind intensity.

19. The system of claim 16, wherein the spatial interpolation performed outside an eyewall of a tropical cyclone is based on shape-preserving spline fitting.

20. The system of claim 16, wherein the actions further comprise adjusting at least a portion of the wind field base data based on a translation speed of the tropical weather system.

* * * * *